(No Model.)
A. H. PERRY.
AIR TIGHT COVER FOR VESSELS.
No. 497,057. Patented May 9, 1893.
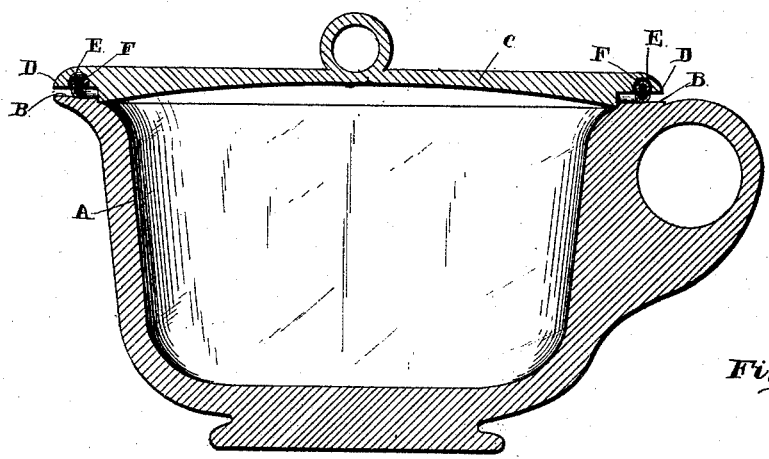
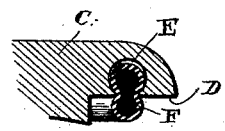
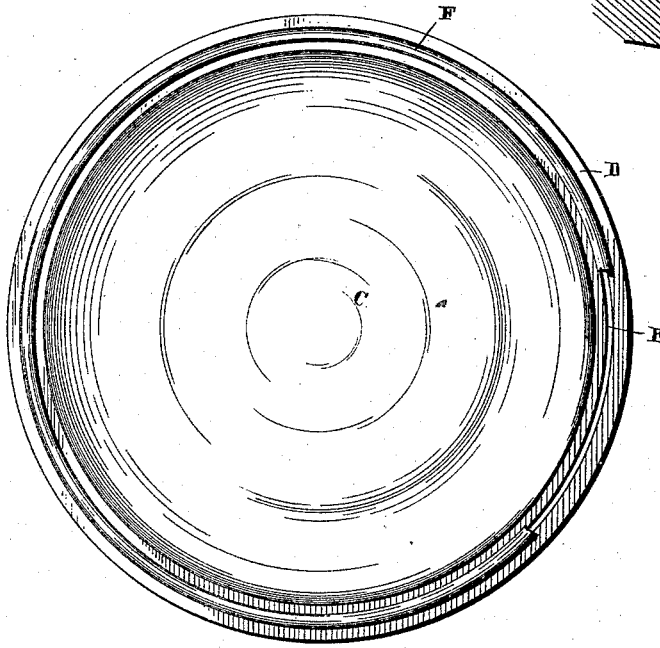
Witnesses
Chas A Ford
S. P. Walhaupter
Inventor
Alonzo H. Perry
By his Attorneys,
C A Snow & Co

UNITED STATES PATENT OFFICE.

ALONZO H. PERRY, OF LOUISVILLE, KENTUCKY.

AIR-TIGHT COVER FOR VESSELS.

SPECIFICATION forming part of Letters Patent No. 497,057, dated May 9, 1893.

Application filed March 16, 1892. Serial No. 425,127. (No model.)

*To all whom it may concern:*

Be it known that I, ALONZO H. PERRY, a citizen of the United States, residing at Louisville, in the county of Jefferson and State of Kentucky, have invented a new and useful Air-Tight Cover for Vessels, of which the following is a specification.

This invention relates to closures for vessels; and it has for its object to provide an improved air tight lid or cover for glass, china, or earthenware vessels, and which is particularly adapted for use upon chambers used in bedrooms or sick rooms, so that the many disagreeable features thereof will be overcome and obviated, and in this connection is equally as well adapted for many other vessels as will be quite apparent.

With these and many other objects in view which will readily appear as the nature of the invention is better understood, the same consists in the novel construction, combination and arrangement of parts hereinafter more fully described, illustrated and claimed.

In the accompanying drawings:—Figure 1 is a vertical sectional view of a chamber or vessel provided with my improved lid or cover. Fig. 2 is a detail in perspective of the lid or cover. Fig. 3 is an enlarged detail sectional view of the lid or cover.

Referring to the accompanying drawings:— A represents an ordinary vessel of any type having the flat upper rim B. The said vessel is inclosed by the lid or cover C having the usual bearing flange D encircling the same and designed to rest upon the flat upper rim B of said vessel. The said flange is provided in the bearing face thereof with the annular groove E, substantially cylindrical in cross-section which groove is wider at the center thereof than at the face of the flange to form a narrow mouth at the terminals of its walls so that the cylindrical gasket ring F will be held firmly therein. The gasket F is an ordinary rubber tube which forms both an air cushion and an air tight joint for the lid. The greater portion of the tube after being bit by the contracted opening of the groove, expands or fills out into the entire annular groove to secure itself firmly in position. The said gasket tube ring is fitted into the groove E so that the same will be sunk therein slightly more than half of its diameter, which is a trifle greater than the opening of the groove at the face of the flange. It will thus be seen that the tube gasket is held firmly in said groove which prevents the same from falling out and also allows the rubber to expand inside of the groove. The lid or cover C when placed upon the vessel A will of its own weight press the tube gasket upon the vessel rim so that every point on its surface is in perfect contact, and a perfect air tight joint is made for the many purposes and advantages hereinbefore set forth.

The construction and many advantages of the herein described closure are now thought to be apparent without further description.

Having thus described my invention, what I claim, and desire to secure by Letters Patent, is—

In a closure for vessels, the combination with a vessel having a flat upper rim; of an inclosing lid or cover having a shouldered bearing flange provided with an annular groove in its face opposite the flat upper rim, said groove being substantially cylindrical in cross section and terminating at the face of the flange in a reduced mouth narrower than the diameter of the groove, and a hollow cylindrical gasket tube of greater diameter than the annular groove and the reduced mouth thereof, and adapted to be sprung into the groove so that the terminals or edges of the walls of the groove indent or bite the sides of the tube at a point below the transverse diameter of the tube, while the greater portion of the tube expands under its elasticity into the entire groove, substantially as set forth.

In testimony that I claim the foregoing as my own I have hereto affixed my signature in the presence of two witnesses.

ALONZO H. PERRY.

Witnesses:
JNO. C. DOOLAN,
JNO. G. SIMRALL.